United States Patent [19]

Freeman et al.

[11] Patent Number: 4,829,462
[45] Date of Patent: May 9, 1989

[54] COMMUNICATION BIT PATTERN DETECTION CIRCUIT

[75] Inventors: William A. Freeman; Daniel E. Hurlimann, both of Austin; Ernest L. Miller, Georgetown; Darryl W. Solie, Austin, all of Tex.

[73] Assignee: International Business Machines Corporation, Armonk, N.Y.

[21] Appl. No.: 873,910

[22] Filed: Jun. 13, 1986

[51] Int. Cl.[4] .............................. G06F 7/00; G05B 1/00
[52] U.S. Cl. .............................. 364/715.11; 340/146.2
[58] Field of Search ............... 364/715, 200 MS File, 364/900 MS File, 728; 340/146.2

[56] References Cited

U.S. PATENT DOCUMENTS

| | | | |
|---|---|---|---|
| 3,281,834 | 10/1966 | Caspers et al. | 364/715 |
| 3,656,109 | 4/1972 | Conway | 340/146.2 |
| 3,670,151 | 6/1972 | Lindsay et al. | 235/181 |
| 3,760,355 | 9/1973 | Bruckert | 340/146.2 |
| 3,959,777 | 5/1976 | Kimmel | 364/900 |
| 3,973,242 | 8/1976 | Field et al. | 340/168 |
| 4,001,787 | 1/1977 | Kimmel | 364/900 |
| 4,003,022 | 1/1977 | Takahashi et al. | 340/146.3 |
| 4,011,547 | 3/1977 | Kimmel | 364/200 |
| 4,021,778 | 5/1977 | Ueda et al. | 340/146.3 |
| 4,064,487 | 12/1977 | Russell et al. | 340/168 |
| 4,135,150 | 1/1979 | Quigley | 340/167 |
| 4,347,606 | 8/1982 | Hoogeveen | 370/105 |
| 4,734,676 | 3/1988 | Huon et al. | 364/715 |

OTHER PUBLICATIONS

Recommendation X.21, "Interface Between Data Terminal Equipment and Data Circuit Terminating Equipment for Synchronous Operation on Public Data Networks", Comité Consultatif International Téléphonique et Télégraphique (CCITT), A Committee of the International Telecommunications Union, 1984.

Witten, "Welcome to the Standards Jungle", BYTE Magazine, Feb. 1983, pp. 146–178.

IBM Technical Disclosure Bulletin, vol. 12, No. 10, Mar. 1970, p. 1684, "Loop Register Pattern Detection", to Herman and Watkins.

IBM Technical Disclosure Bulletin, vol. 23, No. 3, Aug. 1980, pp. 1220–1221, "Special Bit Pattern Detector Employing Majority Logic", to Hodges.

Primary Examiner—Gary V. Harkcom
Assistant Examiner—Long T. Nguyen
Attorney, Agent, or Firm—Thomas E. Tyson

[57] ABSTRACT

A communication bit pattern detection circuit that provides an output signal upon the occurrence of one of several predefined bit patterns for a series of a specified number of bits for a multiple of input signals where each input signal is a continuous stream of serial bit data. The communication bit pattern detection circuit includes a detection stage having combinational logic connected to receive the input signals and providing the logically combined bits to latches of a shift register. The number of latches in the shift register is less than the specified number of bits for the predefined bit patterns. The output of these latches are provided to a logic stage that includes additional combinational logic that provides a nondetection signal. This nondetection signal is provided to indicate that the bits received are not part of any of the predefined bit patterns. The nondetection signal is input to reset a counter. The output of the counter is decoded to provide a signal when the counter counts to the specified number of bits in the predefined bit patterns.

11 Claims, 5 Drawing Sheets

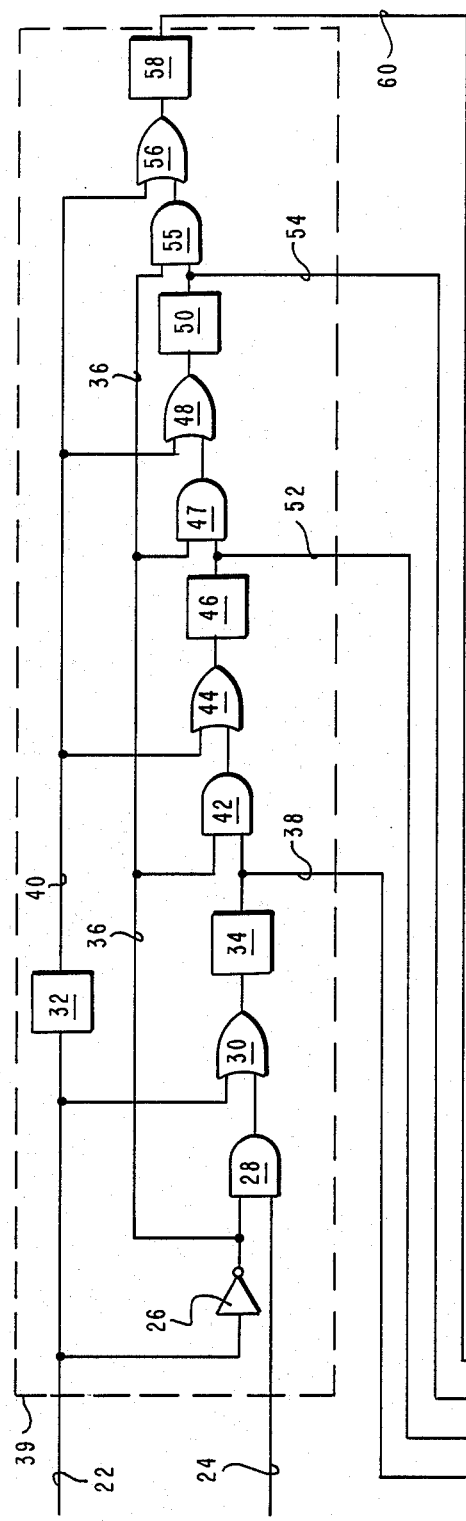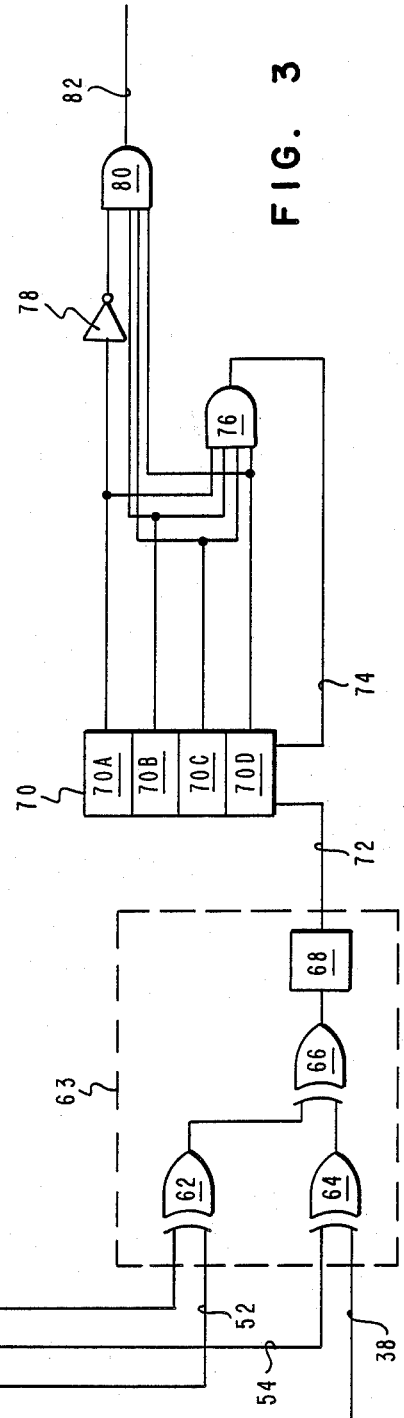
FIG. 3

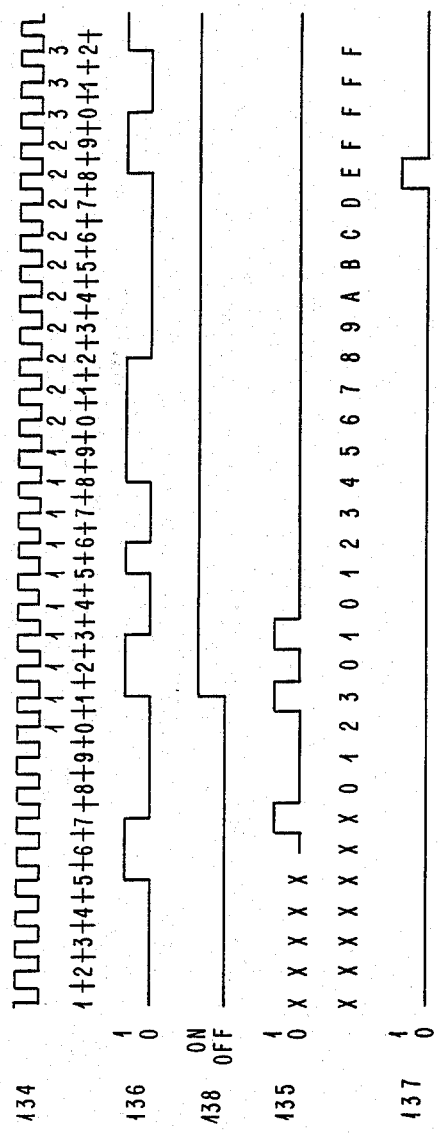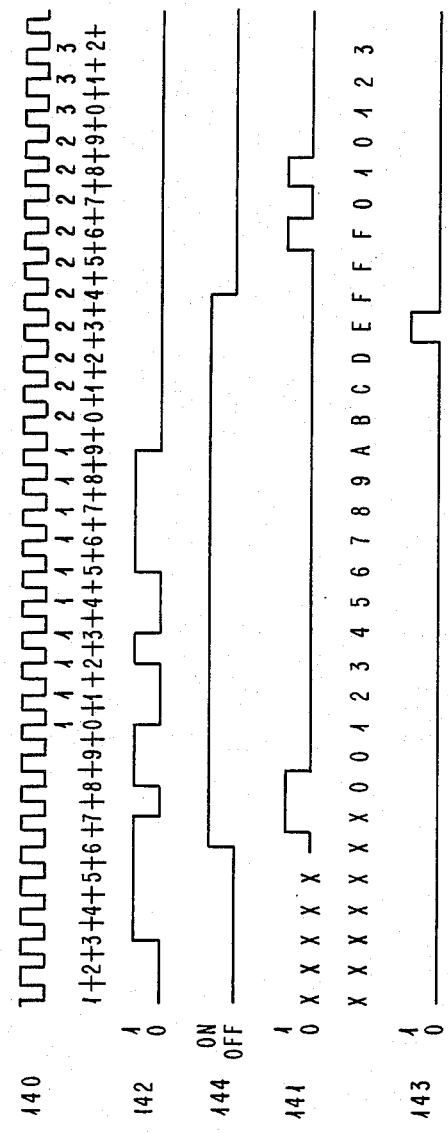
FIG. 4E
FIG. 3F

COMMUNICATION BIT PATTERN DETECTION CIRCUIT

DESCRIPTION

1. Technical Field

The present invention relates to communication interfaces between computers and more specifically to a pattern recognition circuit for detecting communication bit patterns.

2. Background Art

As computers have evolved, communication between computers has become desirable. In the past, several communication standards have been established to allow communication between computers and between computers and computer terminals. One such standard is the RS-232 standard established by the Electronic Industries Association. The official title for this standard is the "Interface Between Data Terminal Equipment and Data Circuit-terminating Equipment Employing Serial Binary Interface". This standard has four parts including a specification for electrical signal characteristics, a specification for the interface mechanical characteristics, a functional description of the signals, and a list of standard subsets of signals for specific interface types. The RS-232 standard includes specifications for the protocol for answering calls and further the means for reversing the transmission direction in a half duplex data link. However, there are several areas that are not covered by the standard such as requirements for auto-dial.

More recently, the CCITT (International Telegram and Telephone Consultative Committee) has recommended a Recommendation X.21 and which is herein incorporated by reference. The CCITT, an agency of the United Nations, issues recommendations rather than standards. While in the past, the CCITT recommendations have been almost identical to the EIA standards, the X.21 recommendation differs significantly from any of the EIA standards. Briefly, the X.21 recommendation provides an interface specification for data equipment to a public data network using a digital synchronous format rather than an analog transmission on telephone networks. This X.21 Recommendation is directed to a public data network. The X.21 Recommendation includes the protocol for making and answering calls and for sending and receiving data after such a connection is established.

A review of the communications standards is contained in a magazine article entitled "Welcome to the Standards Jungle" in the February, 1983 issued to *BYTE* Magazine, herein incorporated by reference.

One important aspect of implementing data communications is providing a technique to recognize certain bit patterns that are provided in serial bit streams. Such bit patterns reflect special conditions that may require intervention by the computer. One such condition is a state change condition such as a call establishment or call disconnect sequence. One traditional technique recognizing a bit pattern includes a register containing the bit pattern to be tested connected to a comparator and a second register, where the second register contains the predefined pattern to be recognized. When the tested pattern matches the predefined pattern, the comparator will output a signal. A further technique is disclosed in an IBM Technical Disclosure Bulletin, Volume 12, No. 10, March, 1970, entitled "Loop Register Pattern Detection" that discloses a register with outputs connected to combinational logic. The output of the combinational logic provides the detection signal. A further technique is disclosed in IBM Technical Bulletin, Volume 23, No. 3, August, 1980, entitled "Special Bit Pattern Detector Employing Majority Logic".

These prior art methods do not provide for pattern detection for multiple input signals. Further, these techniques require the complete pattern to be loaded into a register before the recognition process is initiated. The object of the present invention to provide a bit pattern detection circuit that provides an output signal upon detecting one of several pre-determined patterns for multiple input signals.

It is further an object of the present invention to provide a bit pattern detection circuit having a fast response time while requiring a minimal amount of hardware circuitry.

DISCLOSURE OF THE INVENTION

In accordance with the present invention, a communication bit pattern detection circuit is provided that produces an output signal upon the occurrence of one of several predefined bit patterns for a series of a first specified number of bits for a plurality of input signals, where each input is a continuous serial stream of data bits. The communications bit pattern detection circuit includes a stage that provides a non-detection signal when a second specified number of bits, the second specified number of bits being smaller than the first, do not conform to a portion of one of the predefined patterns for each of the input signals. This circuit further includes a counting stage that counts the bit time periods and provides an output signal when the count equals the first specified number of bits for the predetermined bit patterns. This counting stage is reset, however, upon the occurrence of a non-detection signal.

In one embodiment, the communication bit pattern detection circuit includes a storage section having both combinational logic and a shift register. The combinational logic combines the bits of the several input signals as they are received. The results of this combination is provided to the shift register. The bits in the shift register are shifted each bit time period. The number of bits in the shift register is smaller than the number of bits in the predefined patterns for each of the input signals. The output of the bits in the shift register are again combined by logic circuitry to provide a non-detection signal. This non-detection signal signifies that the pattern in the shift register and therefore, the patterns received from the input signals do not conform to any of the predefined patterns. The non-detection signal is provided as an input to a counter which counts the number of bit time periods. The non-detection signal resets the counter as previously described. However, if the counter proceeds to a count equal to the number of bits in the predefined bit patterns for the input signals, an output signal is provided indicating that one of the predefined patterns has been received. In this embodiment, the output signal latches the counter to prevent any further output signals from being generated until a non-detection signal has been received which then resets the counter.

In this preferred embodiment, the input signals are connected to combinational logic. One input signal is connected to a latch which itself provides input to several other stages of combinational logic connected in the shift register. The output signal from the latches of the shift register are provided to an EXCLUSIVE OR tree. The output of the EXCLUSIVE OR tree provides the non-detection signal which resets the counter. The output of the counter is again connected to combinational logic to provide the count decode signal which designates the detection of the pattern. Also, the output of the counter is decoded to provide a feedback signal to hold the counter at its maximum count until a non-detection signal has been received.

BRIEF DESCRIPTION OF THE DRAWING

The novel features believed characteristic of the invention are set forth in the appended claims. The invention itself, however, as well as other features and advantages thereof, will be best understood by reference to the following description of the Best Mode for Carrying Out the Invention, when read in conjunction with the accompanying figures, wherein:

FIGS. 2A, 2B, 2C, 2D, and 2E illustrate X.21 patterns for the Receive (R) signal and the Indication (I) signal to specify call patterns;

FIG. 3 is a schematic diagram of the communication bit pattern detection circuit; and FIGS. 4A through 4F are timing diagrams illustrating the signal element timing (S), the Indication signal (I), the Receive signal (R) and the occurrence of the resulting output signal.

BEST MODE FOR CARRYING OUT THE INVENTION

Figure 1:
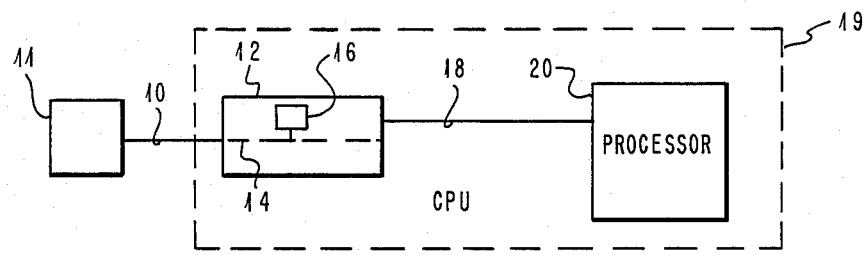
FIG. 1 is a block diagram illustrating the interconnection of a data circuit terminating component with the data terminal components.

A typical configuration for communications to a computer is illustrated in FIG. 1. Line 10 represents the communications line into a modem 11. Modem 11 is commonly referred to as the data circuit-terminating equipment or data communications equipment (DCE). The DCE then provides data over line 10 to central processing unit (CPU) 19 which is termed the data terminal equipment (DTE). The CPU 19 includes a processor 20 connected by a multisignal input/output line 18 to a communications adapter 12. The communications adapter 12 includes an internal line 14 connected to the external line 10 and which is further connected to a pattern detection circuit 16 which provides an indication to processor 20 when one of several predetermined patterns are detected. The signals originating from the Modem 11 onto line 10 include the signal element timing (S), the Indication signal (I), and the Receive signal (R). Also, an optional Byte Timing signal (B) can be included. The X.21 recommendation defines several bit patterns to signify call establishment and call disconnect state transition sequences. In this recommendation, a call pattern is defined as 16 to 24 consecutive sample periods in which the R and I signals are received as predefined patterns. Some of these predefined patterns are illustrated in FIGS. 2A through 2E. Each of the bits in the pattern are received during predefined bit time periods. These bit time periods are defined by the signal element timing S. It is the purpose of the pesent invention to provide an output upon detection of any of these bit patterns illustrated in FIGS. 2A through 2E. In FIGS. 2A through 2D, the Receive (R) signal is repetitive, i.e., repeats itself every four bits. Likewise, in FIG. 2E, the Indication (I) signal is repetitive.

FIG. 3 illustrates the schematic diagram of the present invention. Line 22 is connected to receive the Indication (I) signal. Line 24 is connected to receive the Receive (R) signal. These two signals are provided to logic 39 that includes an invertor 26, AND gates 28, 42, 47 and 55; OR gates 30, 44, 48 and 56; and latches 32, 34, 46, 50 and 58. Latches 34, 46, 50 and 58 are configured as a shift register. The bits in these latches 34, 46, 50 and 58 shift right upon the occurrence of the rising edge of the signal element timing S. The outputs of the circuitry 39 are provided on lines 38, 52, 54 and 60 to an EXCLUSIVE OR tree circuit 63. Circuit 63 consists of EXCLUSIVE OR gates 62, 64, and 66 and a logic 68. The output of the latch 68 is provided as a reset or non-detection signal on line 72 to a counter 70. Counter 70 is a four bit counter including the four stages 70A, 70B, 70C and 70D which each contain one bit. The output of these four stages is decoded through an invertor 78 and an AND gate 80 to provide the pattern detection signal on line 82. The output of stages 70A through 70D are also decoded through AND gate 76 to provide a feedback signal on line 74 to stop the counter 70 from counting and thus latch the output on line 82 until a signal is received on line 72 which resets the counter 70.

Figure 4A:
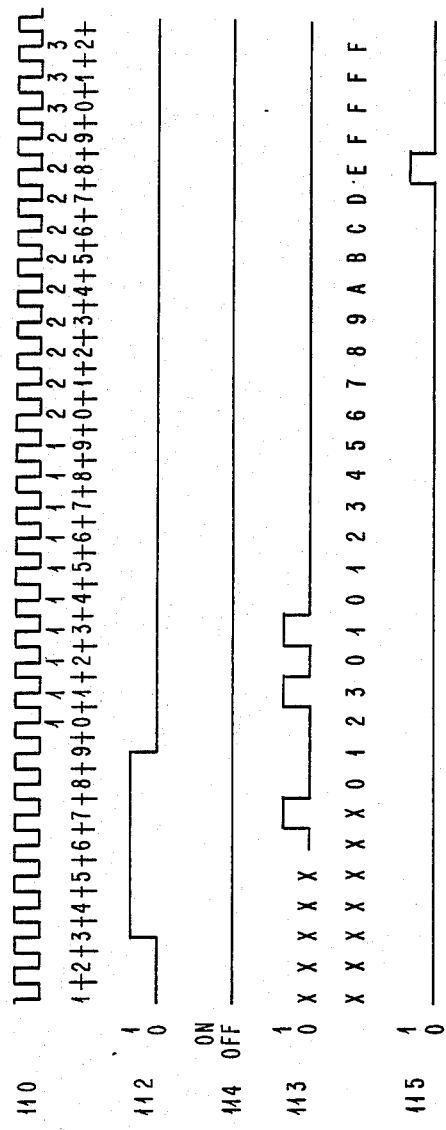

FIG. 4A illustrates a timing pattern for the predefined pattern of FIG. 2A for the operation of the pattern detection circuit in FIG. 3. In FIG. 4A, the signal element timing S is illustrated as line 110, the Receive signal (R) is illustrated as line 112, the Indication signal (I) is illustrated as line 114, the non-detection signal is illustrated as line 113, and the pattern detection signal is illustrated as line 115. The numbers underneath line 113 in FIG. 4A represent the hexadecimal count contained in counter 70 (with "x" representing a "DON'T care" condition). In FIG. 4A, the Indication line 114 remains low. The Receive line 112 transitions from a low to high at the end of bit time period 3. Referring to FIG. 3, the low Indication signal on line 22 provides a "1" output from inverter 26 which is input to AND gate 28 and via line 36 input to AND gates 42, 47 and 55. This low signal in effect, provides for the input of the Receive signal 112 on line 24 through AND gate 28 and, as shifted, through AND gates 42, 47 and 55. Additionally, the low on line 22 is latched in latch 32 to provide an output on line 40 to the three OR gates 44, 48, and 56. In this example, with the indicate signal low, latches 34, 46, 50 and 58 will therefore contain the contents of the receive signal 112 input on line 24. Therefore, in time period 4, latch 34 will contain a one, latches 46, 50 and 58 (which represent the inputs of time periods 3, 2, and 1 respectively) a 0. Therefore, the outputs of these latches 34, 46, 50 and 58 contained on lines 38, 52, 54 and 60 respectively are decoded through the EXCLUSIVE OR tree 63 and provide a output to latch 68 which is provided on line 72 to counter 70 to reset the counter at time period 7. In period 5, the contents of latches 34, 46, 50 and 58 are 1, 1, 0, 0 respectively, which are decoded through the EXCLUSIVE OR tree 63 as a portion of one of the patterns illustrated in FIGS. 2A through 2E and therefore, the counter 70 is not reset via line 72. In the preferred embodiment, the number of latches in the shift register is equal to the number of bits in the repeating patterns of the input signals illustrated in FIGS. 2A through 2E. However, in time period 6, the contents of circuitry 39 is decoded as not being one of the patterns and thus a restart signal is generated on line 72 as illustrated by line 113. At time period 10, the beginning of the sequence where the Receive signal on line 114 is low begins. As is illustrated by the counter numbers located below line 113, the counter begins to increment until time period 28 when a pulse is provided on line 82. Upon the occurrence of the next time period 27, an output is provided on line 74 which stops the counter 70 from counting until a restart signal is received on line 72. Therefore, the predefined pattern of FIG. 2A results in the timing diagram illustrated in FIG. 4A.

Figure 4B:
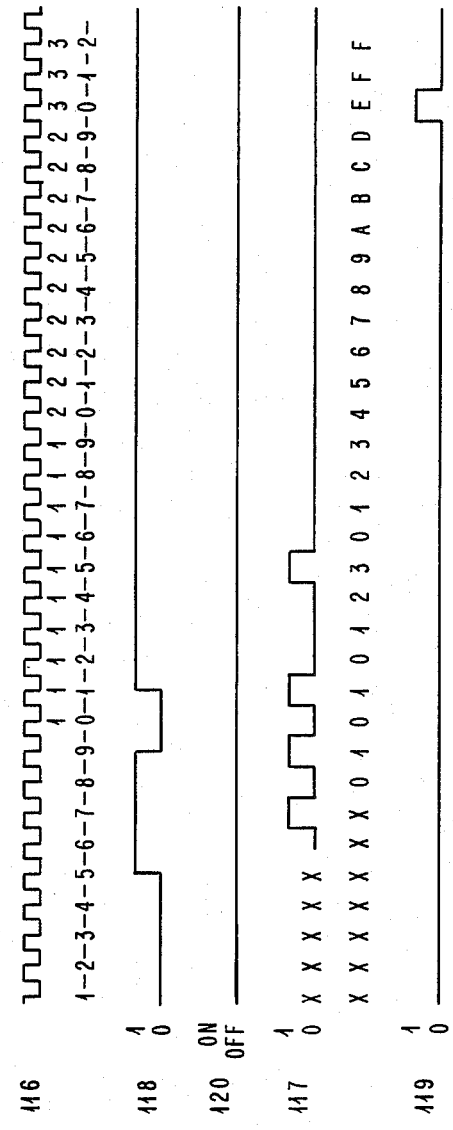

FIG. 4B illustrates the timing diagram for recognition of the predefined pattern in FIG. 2B. Again, line 116 represents the signal element timing S, line 118 represents the Receive (R) signal, line 120 represents the Indication (I) signal, line 117 represents the Reset signal on line 72, and line 119 represents the detect signal on line 82. The output of the counter 70 is illustrated by the numbers underneath the line 117. The counter is reinitialized in time periods 7, 9, 11 and 15 and begins counting to time period 30 when the output signal on line 82 is provided as illustrated by line 119.

Figure 4C:
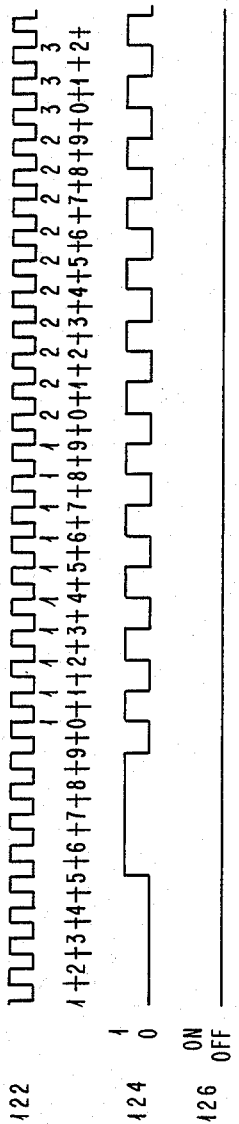

In FIG. 4C, the signal element timing (S) is illustrated as line 122, the Receive signal (R) as line 124, the Indication signal (I) as line 126, line 123 represents the counter reset signal of line 72 and line 125 represents the detect signal on line 82 with the output of the counter 70 illustrated under line 123. FIG. 4C illustrates the timing diagram for the recognition of the pattern of FIG. 2C where the Receive signal (R) transitions from a 0 to a 1 alternatively for 16 bits. In the timing diagram of FIG. 4C, this initially begins in bit period 10 and an output signal on line 125 (line 82 of FIG. 3) will be provided during time period 27.

Figure 4D:
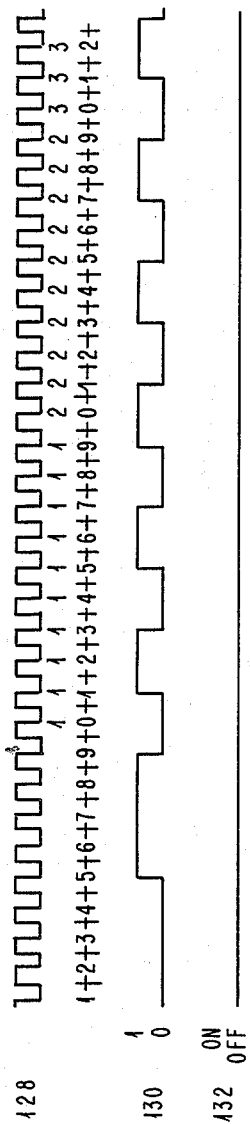

FIG. 4D illustrates the timing diagram for the occurrence of the pattern in 2D. Line 128 represents the signal element timing (S), line 130 represents the Receive signal (R), line 132 represents the Indication signal (I), line 129 represents the counter reset signal (line 72 of FIG. 3), line 131 represents the detect signal (line 82 of FIG. 3) and the output of the counter is illustrated below line 129. In FIG. 2D, the R signal pattern is 0011 for sixteen bits. In FIG. 4D, this pattern begins in time period 10. As shown in time period 26, an output signal is provided on line 131 (line 82 of the circuitry in FIG. 3).

In FIG. 4E, the timing diagram for the detection of the pattern in FIG. 2E is illustrated. In FIG. 4E, the line 134 represents the signal element timing (S), line 136 represents the Receive signal (R), line 138 represents the Indication signal (I), line 135 represents the counter reset signal (line 72 of FIG. 3), and line 137 represents the detect signal (line 82 of FIG. 3) and the output of the counter 70 is illustrated underneath line 135. Referring to FIG. 4E, the Receive signal 136 provides several state transitions during the time periods illustrated. The Indication signal on line 138 provides a state transition during period 11. Referring to FIG. 2E, the pattern to be recognized defines a state transition between the first and second bits of the Indication (I) signal and the receive (R) bits are "don't cares". The output signal on line 137 is provided during time period 29.

FIG. 4 illustrates the timing diagram for the recognition of the patterns in FIG. 2E and the resetting of the Indication (I) signal. The signal element timing (S) is illustrated as line 140, the Receive (R) signal as line 142, the Indication signal (I) as line 144, line 141 as the counter reset signal and line 143 as the detect signal with the output of the counter illustrated under line 141. In this FIG. 4F, the Indication signal transitions at time period 6 and at time period 24, an output signal is provided on line 143 at time period 23. After the Indication signal drops, the counter 70 is reset at time period 27.

This embodiment provides for the detection of patterns of two separate signals by logically combining these input signals as received and shifting these input signals through a shift register. This embodiment was designed to recognize the predetermined bit patterns illustrated in FIGS. 2A through 2E. Since these patterns included repeating four bit patterns, a four bit shift register was used. For a larger number of bits in a repeating pattern, a larger number of latches in the shift register would be implemented. For this embodiment, the four bit shift register provided four bit parallel output signals. These signals are continually decoded through the EXCLUSIVE OR tree 63 (FIG. 3) to provide a restart signal to the timer 70. Because of this unique arrangement, only 4 bits need to be decoded at a single time thus reducing the amount of hardware required in the EXCLUSIVE OR tree 63. Also because of the unique structure of this circuit, the output of the timer 70 can be quickly decoded as illustrated with inverter 78 and AND gate 80 to provide the required detection signal on line 82.

For other patterns, the combinational logic contained in circuit 39 would be changed. It should be apparent to one skilled in the art that by merely adding combinational logic, additional input signals may be connected to circuitry 39 to provide the combined inputs to the latches of the shift register. In a similar manner, the EXCLUSIVE OR tree 63 can be varied to accommodate additional patterns by adding to or altering the logic contained therein. Further, various modifications such as additional latches to temporarily store the input signals for the combinational logic in a manner similar to latch 32 (FIG. 3) may be implemented. Additionally, circuitry 39 may actually include shift registers for each of the input signals to provide temporary storage for the combinational logic. The output of this combinational logic would be stored in shift register latches such as latches 34, 46, 50 and 58. Additionally the EXCLUSIVE OR tree circuitry 63 could be altered to accommodate the decoding of these different predefined patterns. It is, therefore, contemplated that the appended claims will cover any such modifications or embodiment that fall within the true scope of the invention.

We claim:

1. A communication bit pattern detection circuit to provide an output signal upon an occurrence of one of several predefined bit patterns for a series of a first number of bits for a plurality of input signals, each input signal being a stream of serial bit data, said communication bit pattern detection circuit comprising:

receiving means for receiving at least two input lines, each input line receiving an input signal of a stream of serial bit data;

first logic means connected to said receiving means, for logically combining corresponding bits from said input lines serial data, said logic means including logic gates arranged according to said predefined bit patterns;

latching means connected to said logic means, for storing a second number of said logically combined bits;

detection means for providing a nondetection signal when said second number of bits do not conform to a portion of one of said predefined patterns for each of said input signals; and counting means connected to said detection means for counting bit time periods and providing the output signal when the count equals the first number, said counting means being reset upon an occurrence of the nondetection signal.

2. A communication bit pattern detection circuit according to claim 1 wherein said detection means further includes second logic means for logically combining said stored bits of said latching means to provide said nondetection signal.

3. A communication bit pattern detection circuit according to claim 2 wherein said counting means includes means for maintaining the output signal upon occurrence until the counting means receives the nondetection signal.

4. A communication bit pattern detection circuit connected to receive several input signals, each input signal being a stream of serial bit data, and to provide an output signal upon an occurrence of one of several predefined bit patterns for a series of a first plurality of bits for the input signals, said communication bit pattern detection circuit comprising:

receiving means for receiving at least two input lines, each input line receiving an input signal stream of serial bit data;

first logic means connected to said receiving means, for logically combining corresponding bits from each input signal during a bit time period, said first logic means including logic gates arranged according to said predefined input patterns;

latch means connected to said first logic means for storing a second plurality of said logically combined bits from said first logic means, said second plurality being less than said first plurality;

second logic means connected to said latch means for providing a nondetection signal when the stored second plurality of bits do not conform to a portion of one of several predetermined bit patterns; and counting means connected to said second logic means for counting bit time periods and providing the output signal when the count equals the first plurality, said counting means being reset upon an occurrence of the nondetection signal.

5. A communication bit pattern detection circuit according to claim 4 wherein said second logic means includes a plurality of EXCLUSIVE OR gates connected to the latch means for logically combining the contents of said latch means to provide the nondetection signal.

6. A communication bit pattern detection circuit according to claim 5 wherein said counting means includes means for maintaining the output signal upon occurrence until the counting means receives the nondetection signal.

7. A communication bit pattern detection circuit connected to receive first and second input signals, each of said input signals being a continuous stream of data bits, each bit provided during a bit period, said communication bit pattern detection circuit providing an output signal upon the simultaneous occurrence of one of several predefined bit patterns for a series of a first plurality of bits for the first input signal with an occurrence of one of a second plurality of predefined bit patterns for a series of the first plurality of bits for the second input signal, each of said predefined bit patterns including a repeating bit sequence of the second plurality of bits, said communication bit pattern detection circuit comprising:

receiving means for receiving said first and second input signal;

first logic means, connected to said receiving means, for logically combined bits from each input signal during a bit time period, said first logic means including logic gates arranged according to said predetermined bit patterns;

latch means connected to said first logic means for storing the second plurality of said combined bits from said first logic means;

second logic means connected to said latch means for providing a nondetection signal when the stored second plurality of bits do not conform to a portion of one of several predetermined bit patterns; and counting means for counting bit time periods and providing the output signal when the count equals the first plurality, said counting means being reset upon an occurrence of the nondetection signal.

8. A communication bit pattern detection circuit according to claim 7 wherein said latch means further includes means for shifting said combined bits in said latch means as each combined bit is provided during each bit period while maintaining said second plurality of bits.

9. A communication bit pattern detection circuit according to claim 8 wherein said second logic means includes a plurality of EXCLUSIVE OR gates connected to the latch means for logically combining the contents of said latch means to provide the nondetection signal.

10. A communication bit pattern detection circuit according to claim 9 wherein said EXCLUSIVE OR gates are configured as a tree of levels of EXCLUSIVE OR gates, each gate being connected to receive two inputs and said tree having a first level of EXCLUSIVE OR gates connected to the latch means and a last level connected to provide the nondetection signal.

11. A communication bit pattern detection circuit according to claim 10 wherein said counting means includes means for maintaining the output signal upon occurrence until the counting means receives the nondetection signal.

* * * * *

UNITED STATES PATENT AND TRADEMARK OFFICE
CERTIFICATE OF CORRECTION

PATENT NO. : 4,829,462

DATED : May 9, 1989

INVENTOR(S) : W. A. Freeman et al

It is certified that error appears in the above-identified patent and that said Letters Patent is hereby corrected as shown below:

Col. 8, line 16, delete "combined" and insert --combining--.
Col. 8, line 19, delete "predetermined" and insert --predefined--.

Signed and Sealed this

Tenth Day of December, 1991

Attest:

HARRY F. MANBECK, JR.

*Attesting Officer*  *Commissioner of Patents and Trademarks*